United States Patent
Leighton

(10) Patent No.: US 7,773,532 B2
(45) Date of Patent: Aug. 10, 2010

(54) METHOD FOR ENABLING COMMUNICATION BETWEEN TWO NETWORK NODES VIA A NETWORK ADDRESS TRANSLATION DEVICE (NAT)

(75) Inventor: Gerald Winston Leighton, Aldridge (GB)

(73) Assignee: Group 3 Technology Limited (GB)

( * ) Notice: Subject to any disclaimer, the term of this patent is extended or adjusted under 35 U.S.C. 154(b) by 115 days.

(21) Appl. No.: 12/223,637

(22) PCT Filed: Jun. 28, 2007

(86) PCT No.: PCT/GB2007/002426

§ 371 (c)(1),
(2), (4) Date: Aug. 5, 2008

(87) PCT Pub. No.: WO2008/003935

PCT Pub. Date: Jan. 10, 2008

(65) Prior Publication Data

US 2009/0175165 A1     Jul. 9, 2009

(30) Foreign Application Priority Data

Jul. 6, 2006     (GB) .................................. 0613417.5

(51) Int. Cl.
*H04J 1/16* (2006.01)
*H04L 12/28* (2006.01)

(52) U.S. Cl. ........................................ 370/242; 370/392

(58) Field of Classification Search ................. 370/242, 370/392

See application file for complete search history.

(56) References Cited

U.S. PATENT DOCUMENTS

| 6,674,758 | B2 * | 1/2004 | Watson ........................ 370/401 |
| 7,002,989 | B2 * | 2/2006 | Agrawal et al. ............. 370/467 |
| 7,333,500 | B2 * | 2/2008 | Roshko ........................ 370/401 |

(Continued)

OTHER PUBLICATIONS

International Search Report Oct. 23, 2007.

*Primary Examiner*—Andrew Lee
(74) *Attorney, Agent, or Firm*—Ira S. Dorman

(57) ABSTRACT

A method is provided for enabling communication between first and second network nodes (1, 7) by way of a network address translation device (3, 9), which network nodes are each capable of communicating with a server (11). The first network node (1) establishes communication with the server (11) requesting communication with the second network node (7). The first network node then establishes communication with the second network node by way of the network address translation device (3, 9), including sending a plurality of first dummy packets from the first network node directly to the second network node. The server (11) establishes communication with the second network node requesting communication between the second network node and the first network node. Thereafter, the second network node establishes communication with the first network node byway of the network address translation device, including sending a plurality of second dummy packets from the second network node directly to the first network node, transmission of the second dummy packets overlapping with transmission of the first dummy packets. Thereafter data is echanged solely between the first and second network nodes.

12 Claims, 1 Drawing Sheet

U.S. PATENT DOCUMENTS

Figure 1:
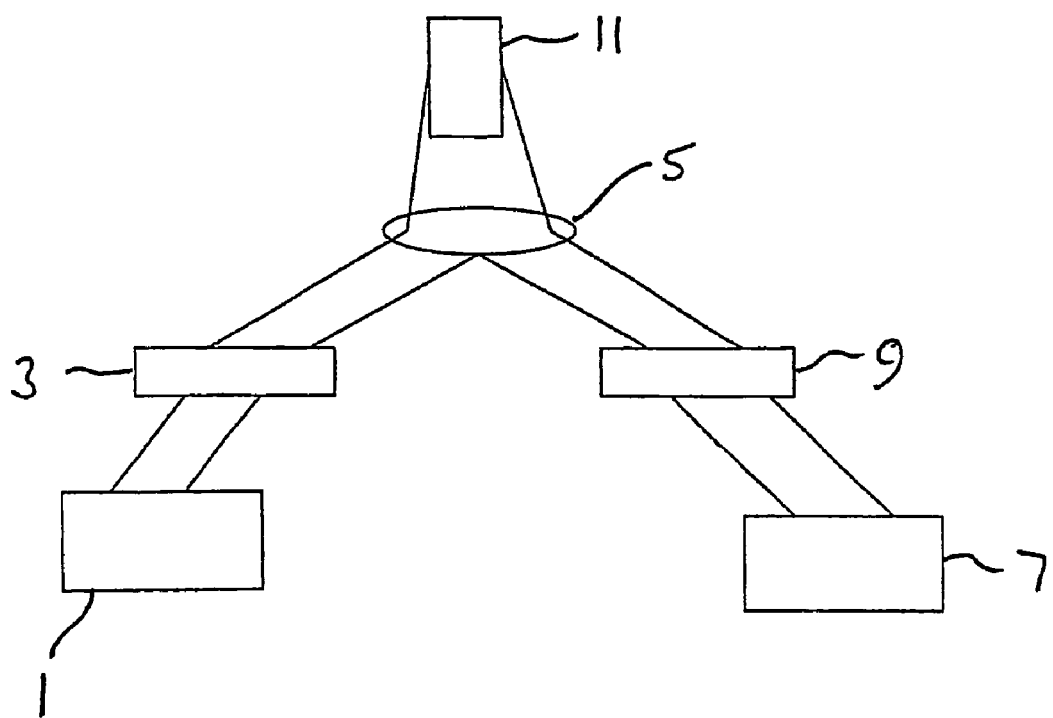

| | | |
|---|---|---|
| 7,406,526 B2 * | 7/2008 | Benchetrit et al. .......... 709/228 |
| 2003/0048780 A1 * | 3/2003 | Phomsopha ................. 370/389 |
| 2003/0055978 A1 | 3/2003 | Collins |
| 2003/0227903 A1 * | 12/2003 | Watson ....................... 370/352 |
| 2004/0085952 A1 * | 5/2004 | Watson ....................... 370/352 |
| 2006/0072150 A1 * | 4/2006 | Justice ...................... 358/1.15 |
| 2006/0072569 A1 | 4/2006 | Eppinger |
| 2007/0019540 A1 * | 1/2007 | Biswas et al. ............... 370/217 |
| 2007/0140159 A1 * | 6/2007 | Eronen et al. ............... 370/328 |
| 2008/0232362 A1 * | 9/2008 | Miyajima et al. ........... 370/389 |

\* cited by examiner

METHOD FOR ENABLING COMMUNICATION BETWEEN TWO NETWORK NODES VIA A NETWORK ADDRESS TRANSLATION DEVICE (NAT)

This invention relates to a method of enabling communication between two network nodes.

Communication between two network nodes, for example VoIP (Voice over Internet Protocol) telephone calls are becoming well known. However, the current methods of implementing VoIP calls are generally unsatisfactory.

Skype is a peer-to-peer VoIP and involves file and/or resource sharing through other devices connected to the communal network, for example to overcome problems with firewalls and network address translation (NAT) devices.

IAX2 is a hosted VoIP protocol and requires full hosting of both signalling and voice components and depends upon server reliability to provide a continuous service.

SIP is a transaction-based protocol which defines a method of enabling a data session between two endpoints by employing hosted signalling and direct data exchange, implementation of which works when both endpoints are in a non-networked environment. An additional protocol is defined in STUN to enable SIP signalling to reach an endpoint which is behind a networked connection. However SIP/STUN has limited functionality and reliability and does not function in all NAT environments. To overcome some of these drawbacks, full functionality has been achieved with the use of Session Border Controllers. However, this requires both signalling and data to be continuously hosted through the Session Border Controllers.

It is therefore an object of the present invention to provide a method for enabling communication between two network nodes which overcomes, or at least ameliorates, the problems associated with known methods.

According to the present invention there is provided a method for enabling communication between first and second network nodes by way of a network address translation device, which network nodes are each capable of communicating with a server, which method comprises the steps of:

causing the first network node to establish communication with the server requesting communication with the second network node;

causing the first network node to establish communication with the second network node by way of the network address translation device, which step includes sending a plurality of first dummy packets from the first network node directly to the second network node;

causing the server to establish communication with the second network node requesting communication between the second network node and the first network node;

causing the second network node to establish communication with the first network node by way of the network address translation device, which step includes sending a plurality of second dummy packets from the second network node directly to the first network node, transmission of the second dummy packets overlapping with transmission of the first dummy packets; and thereafter exchanging data directly between the first and second network nodes.

Thus the present invention is based on the concept that the exchange of dummy packets between two network nodes by way of at least one network address translation device will create a common path through the or each network address translation device and effect NAT traversal.

The server may maintain a record of identification details of all network nodes which may wish to communicate with it.

The network address translation device may be a router.

The method may include the preliminary step of the first and second network nodes logging on to the server to indicate an availability for establishing communication with another network node. The preliminary step and the subsequent steps may be effected using different protocols (such as TCP and UDP).

The method may include the additional step, prior to the first network node establishing communication with the second network node, of causing the server to communicate identification details of the second network node to the first network node.

The method may include the step, prior to the second network node establishing communication with the first network node, of causing the server to communicate identification details of the first network node to the second network node.

The method may include, after the step of the first network node establishing communication with the second network node, the step of causing the first network node to notify the server that it is establishing communication with the second network node.

An error may be determined if communication between the first and second network nodes or between the second and first network nodes is not established within a predetermined time and/or within a predetermined number of dummy packets being sent. An error may be determined when the first of the predetermined time and the predetermined number of dummy packets is reached. The predetermined time may be substantially 4 seconds, The predetermined number of dummy packets may be substantially ten packets.

The method may incorporate an error auto-reconnect procedure in the event that an error occurs during the step of either of the first and second network nodes establishing communication with the other of the first and second network nodes. Error auto-reconnect may involve the respective network node communicating the error to the server. Subsequently, the server may communicate the error to the other network node which, in turn, re-establishes communication with the server and the server thereafter communicates identification details of the other network node to the respective network node and the method for enabling communication reverts to the step of causing the first network node to establish communication with the second network node. Communication of the error to the other network node may be effected using a different protocol to the other steps of error auto-reconnect.

For a better understanding of the present invention and to show more clearly how it may be carried into effect reference will now be made, by way of example, to the accompanying drawing which is a diagrammatic illustration of one embodiment of a method for enabling communication between two network nodes in accordance with the present invention.

FIG. 1 shows a first network node 1, which in practice is one of one or more telephones connected to a first network address translation (NAT) device 3, such as a router. The router 3 incorporates a firewall, but if desired the firewall may be separate from and downstream of the router. The router/firewall 3 is connected to the Internet 5 in any conventional manner.

A second network node 7, again in practice one of one or more telephones connected to a network address translation (NAT) device 9 such as a router. The router 9 incorporates a firewall, but if desired the firewall may be separate from and downstream of the router 9. The router/firewall 9 is connected to the Internet 5 in any conventional manner.

Also connected to the Internet 5 in any conventional manner is an authentication server 11. The authentication server contains a number of databases including a user table containing a user identification (such as user name and/or user telephone number) and user password. The user table may contain further information if desired, such as registration information. The authentication server 11 also contains a random access memory (RAM) table with user identification (such as user name and/or user telephone number), user password and, where available, the user datagram protocol (UDP) public and private IP addresses. The authentication server 11 also contains a contacts table which is a list of all users with references to the other users in that user's address book. The authentication server 11 also contains a pending table which includes details of contacts that are not yet fully confirmed. An entry in the pending table is transferred to the contacts table only when the user identified in the entry has agreed to its incorporation in the contacts table.

Logging On

The first step in enabling communication between two network nodes, such as nodes 1 and 7 is for the nodes to be logged on to the authentication server 11. Logging on is effected, for example in respect of the first network node 1, by the user starting the appropriate software (or powering-up a suitable device) and at a LogOn screen entering user identification (such as a user name and/or telephone number) and a password.

The network node 1 attempts communication with the authentication server 11 by conducting a domain name system (DNS) look-up of the domain name of the authentication server to acquire its IP address, opening a transmission control protocol (TCP) connection to the IP address of the authentication server through a specified port (such as Port 11149) and transmitting to the authentication server a log command (Logon), the user identification (generally user name and telephone number), password, private (TCP) IP address and private (TCP) port. The first network node 1 may also transmit the media access control (MAC) address of the appropriate network card to the authentication server 11.

The authentication server 11 checks and verifies the user's identification and password in the user table. If the user identification and the password are not verified then the authentication server aborts the connection. Otherwise, the authentication server 11 activates LogOn and issues a welcome command to the first network node 1 over the TCP connection on the specified port. The authentication server 11 additionally acquires the TCP public and private IP address and TCP public and private port of the first network node 1.

With communication established, the first network node 1 opens an outgoing UDP connection with the authentication server through a specified port (such as Port 11148) by forcing the router 3 to open an available UDP port (which may be in a range allocated by an administrator). Once UDP connection has been established, the first network node 1 sends the authentication server a log command (Logon), the user Identification (generally user name and telephone number), password, private (UDP) IP address and private (UDP) port. The authentication server 11 checks and verifies as necessary elements of the information provided in the RAM table and, if valid, updates the table with the user's private UDP IP address and port and acquires and updates the RAM table with the user's public UDP IP address and port.

The authentication server then updates the contacts table to identify instances where the user of the first network node 1 appears in the address book of other logged on users. The authentication server 11 then signals to all other users connected through other network nodes by way of their TCP connection that the user of the first network node 1 has logged on.

The first network node 1 receives a launch command over the UDP connection and enters a main (or running) mode.

Logging Off

A user may log off for a number of reasons. He may log off at the end of a session or the authentication server 11 may drop a connection to force a logoff or may force a log off in the event of a dropped connection.

Normal LogOff

In this event the user selects the required action byway of the software/firmware and the first network node 1 transmits a log command (LogOff) to the authentication server 11 over the TCP connection. On receipt of a logoff command, the authentication server resets the user's status to LogOff, updates the contacts table to identify instances where the user of the first network node 1 appears in the address book of other logged on users connected through other network nodes and signals the other network nodes by way of their TCP connection that the user of the first network node has logged off. The authentication server 11 also deletes the details of the user from the RAM table and drops both the TCP and UDP connections with the user of the first network node. The first network node 1 then displays a LogOff screen.

Forced Logoff

In this situation the authentication server 11 encounters a dropped Internet connection and follows the normal TCP closure and time-out procedure.

The authentication server 11 immediately attempts to re-establish connection until a predetermined time period has elapsed. If at the end of that time period no information is forthcoming, the authentication server resets the user's status to LogOff, updates the contacts table to identify instances where the user of the first network node 1 appears in the address book of other logged on users connected through other network nodes and signals the other network nodes by way of their TCP connection that the user of the first network node has logged off. The authentication server 11 also deletes the details of the user from the RAM table and drops the UDP connection with the user of the first network node in addition to the dropped TCP connection. In the event of a dropped Internet connection then both UDP and TCP connections will be dropped.

Similarly, the first network node 1 will encounter a dropped Internet connection through the TCP port and automatically follows a LogOn Retry procedure to attempt to re-establish the TCP connection with the authentication server 11. If no information is forthcoming after a predetermined time period has elapsed, the first network node then displays a LogOff screen.

Call Set-Up

Call set-up is carried out by communication over the UDP connection. To set up a call it is assumed that the user of the first network node 1 and the user of the second network node 7 have both logged on to the authentication server 11 and the server knows both the UDP and TCP public and private IP addresses and ports. The user of the first network node 1 then decides to call the user of the second network node 7, for example by picking up a handset and dialling the user identification (telephone number) of the user of the second network node 7. Alternatively, the user of the first network node 1 may select the identification of the user of the second network node 7 from a phone list or other short-cut well known to the skilled person.

Call set-up takes place only over the UDP connection.

Step 1

In this step the first network node establishes communication with the authentication server.

Step 1 is based on the following information known to the first network node:

Telephone number of user at the first network node (T1)
Telephone number of user at the second network node (T2)
Unique ID of the first network node (MAC address) (ID1)
Unique ID of authentication server (IDs)
UDP private IP address and private port of user at the first network node (Q1)

The first network node 1 checks to see whether the telephone number for the user of the second network node 7 is in the phone book of the first network node. If the telephone number is not present then an entry is made into reserved phone book memory.

If a match is found then it is likely that the phone book will also contain the unique ID (for example MAC address) of the second network node. If this is not the case, or if the data is incorrect, this will be established and corrected as part of the data transmission procedure. The following signal is transmitted to the authentication server 11:

*STEP1*; IDs; ID1; T2; {Q1}; {ID2}

Alternatively, if no entry is found in the phone book, the following signal is transmitted to the authentication server 11:

*STEP1*; IDs; ID1; T2; {Q1};

Step 2

In Step 2 the authentication server responds to the first network node 1.

This step is based on the following information known to the authentication server:

Telephone number of user at the first network node (T1)
Telephone number of user at the second network node (T2)
Unique ID of the first network node (MAC address) (ID1)
Unique ID of the second network node (MAC address) (ID2)
Unique ID of the authentication server (IDs)
Initial UDP public and private IP address and initial public and private port of user at the first network node (P1)
Initial UDP public and private IP address and initial public and private port of user at the second network node (P2)

The authentication server 11 checks its database to verify recognition of the telephone number of the user at the second network node 7. If the telephone number is not verified then there is no valid Internet call. In this case, a call may be attempted through a PSTN which forms no part of the present invention.

If the telephone number of the user at the second network node is verified the authentication server 11 updates receipt of communication from the first network node and transmits a confirmation to the first network node 1 in the following form:

*STEP2*; IDs; ID1; P1; ID2; P2; T2;

Step 3

In Step 3 the first network node 1 establishes communication with the second network node 7.

Step 3 is based on the following information known to the first network node:

Telephone number of user at the second network node (T2)
Unique ID of the first network node (MAC address) (ID1)
Unique ID of the second network node (MAC address) (ID2)
Unique ID of the authentication server (IDs)
UDP public and private IP address and public and private port of user at the first network node (P1)
UDP public and private IP address and public and private port of user at the second network node (P2)

The first network node 1 updates its phone book with the public and private IP address and public and private port of user at the second network node (P2) (together with the unique ID of the second network node and the telephone number of the second network node if either is different to the stored value).

The first network node 1 then attempts to set up an outgoing connection by signalling the second network node 7 using the UDP public IP address and public port of the second network node and by sending a series of dummy packets (which contain minimal and insignificant data such as the unique ID of the first network node (ID1)) through its private UDP port directly to the second network node (that is, not by way of the authentication server 11) for a predetermined period or when a predetermined number of dummy packets have been sent. The message is in the following form:

*STEP3*; ID1; ID2; Q1; "Dummy Content=?";

The UDP private IP address and port Q1 of the first network node forms part of P1.

The message is sent to the UDP destination address of P2 until either the predetermined period has expired or until the predetermined number of dummy packets have been sent, whichever event occurs first. The predetermined period may be variable, but a period of about 4 seconds has been found to be ideal. Similarly, the predetermined number of dummy packets may be variable, but a number of about 10 has been found to be ideal. An error condition will arise if either the predetermined period expires or the predetermined number of dummy packets is exceeded.

Step 4

In Step 4 the first network node 1 signals the authentication server 11.

Step 4 is based on the following information known to the first network node:

Telephone number of user at the second network node (T2)
Unique ID of the first network node (MAC address) (ID1)
Unique ID of the second network node (MAC address) (ID2)
Unique ID of the authentication server (IDs)
UDP public and private IP address and public and private port of user at the first network node (P1)
Initial UDP public and private IP address and initial public and private port of user at the second network node (P2)
Notification that the first network node is attempting to call the second network node (1K2)

The first network node 1 immediately sends a signal to the authentication server 11 in the following form:

*STEP4*; ID1; IDs; ID2; {P1}; {P2}; {1K2};

In the event of an error (which will only arise if the predetermined time period has passed or the number of dummy packets has exceeded the predetermined number) an error command ERROR is also sent.

Step 5

In Step 5 the authentication server 11 signals the second network node 7.

Step 5 is based on the following information known to the authentication server:

Telephone number of the user at the first network node (T1)
Telephone number of user at the second network node (T2)
Unique ID of the first network node (MAC address) (ID1)
Unique ID of the second network node (MAC address) (ID2)
Unique ID of the authentication server (IDs)

UDP public and private IP address and public and private port of user at the first network node (P1)

UDP public and private IP address and public and private port of user at the second network node (P2)

Notification that the first network node is attempting to call the second network node (1K2)

The authentication server 11 now signals the second network node 7 and, if there is no error, sends the following message:

*STEP5*; IDs; ID2; ID1; P1; {1K2}; {P2}

In this step, in order to minimise the amount of effort, the authentication server is not actually verifying this communication is successful. If an error was to occur this would be dealt with under an error auto-reconnect procedure to be described hereinafter.

Step 6

In Step 6 the second network node 7 establishes communication with the first network node 1.

Step 6 is based on the following information known to the second network node:

Unique ID of the first network node (MAC address) (ID1)

Unique ID of the second network node (MAC address) (ID2)

Unique ID of the authentication server (IDs)

UDP public and private IP address and public and private port of user at the first network node (P1)

UDP public and private IP address and public and private port of user at the second network node (P2)

Notification that the first network node is attempting to call the second network node (1K2)

In Step 6 the second network node 7, on receiving the message from the authentication server 11, updates its phone book with the most recent information for P1 and ID1 or alternatively, if the information is not present, adds the information to its phone book. The second network node also updates its own P2 information.

The second network node 7 then attempts to set up an outgoing connection by signalling the first network node 1 using the UDP public IP address and public port of the first network node by sending a series of dummy packets (which contain minimal and insignificant data such as the unique ID of the second network node (ID2)) through its private UDP port directly to the first network node (that is, not by way of the authentication server 11) for a predetermined period or when a predetermined number of dummy packets have been sent. The message is in the following form:

*STEP6*; ID2; ID1; Q2; "Dummy Content=?";

The UDP private IP address and port Q2 of the second network node forms part of P2.

The message is sent to the UDP destination address of P1 until either the predetermined period has expired or until the predetermined number of dummy packets have been sent, whichever event occurs first. An error condition will arise if either the predetermined period expires or the predetermined number of dummy packets is exceeded.

Step 7

After Steps 1 to 6 have been completed then, provided the predetermined period has not expired or the number of dummy packets has not been exceeded, both the first and second network nodes 1 and 7 will be sending dummy packets directly to the public IP address and public port of each other in an overlapping manner.

By this stage the routers 3 and 9 associated with the first and second network nodes 1 and 7, respectively, as well as the respective network node 1 and 7 will know the public IP address and public port as well as the private IP address and private port of the other network node. Because each router 3 and 9 watches both incoming and outgoing traffic, each router will determine that it is receiving an incoming communication from a source to which it is also in the process of sending a communication. Consequently, the port address translation feature of each router will assume that both communications are one and the same and each will map (or bind) an inbound path from its public port to its private port to correspond to the outbound path so as to set up two-way communication through each router and complete NAT traversal.

Since each of the first and second nodes 1 and 7 is expecting communication from the other of the nodes, as soon as NAT traversal is complete each node will be able to reply immediately to data received from the other node. In the case of voice communication, each node will be presenting its user with an appropriate sound (for example, a ringing tone) and as soon as NAT traversal is complete the ringing tone will stop and voice communication will start. Of course, if the second network node (the node being called) is not available the user of the first network node 1 will be presented with a busy tone and no path will be opened to the second network node.

In the event that only a single router needs to be traversed, the call set-up is essentially the same, except that only one router will be involved.

At this point, information that the first network node 1 possesses can be passed to any conventional protocol stack call control module to enable that protocol stack to follow its convention for ringing and call pick-up with voice communication to follow. Suitable protocol stacks include IAX2, SIP and H323, and each has in-built procedures for handling events such as ring tone on/off, on-hook/off-hook detection and the like.

Information passed to the protocol stack includes, but is not limited to, the UDP public IP address and public port of the destination protocol stack, i.e., P2. The authentication server 11 also has additional information at this time, such as the TCP public and private IP address and public and private port of the destination protocol stack.

It should be noted that if the protocol stack requires knowledge of multiple ports then the call set-up process can include the acquisition of additional public and private IP addresses and ports and these can be provided to other users and to the authentication server if required.

The procedure for establishing a voice connection is now complete and communication can continue directly (solely) between the first and second network nodes by UDP without passing through the authentication server 11.

It should be noted that the term user identification has been used herein to denote two items of data—the user's name and the user's telephone number. Strictly, only a single form of user identification is required, such as a name or a number. However, it is convenient in practice to employ both names and numbers inasmuch as users tend to prefer to dial numbers and to associate those numbers with the names of other users. Alternatively, different or additional features may be used for user identification, such as biometric details of the user. Although the present invention has been explained in the context of a voice call, it should be noted that the nature of the data transmitted is not critical and could, for example, be video or other data. Moreover, the user identification and password may in certain circumstances be embedded in hardware and may be communicated automatically at LogOn.

Thus the present invention provides a method for enabling communication between two network nodes in which the initial steps of establishing communication between the two network nodes are introduced by a server, but in which subsequent communication takes place directly between the two network nodes without the need for a server. The transmission of dummy packets between the network nodes facilitates a router or other NAT device associated with one of the network nodes to become "friendly" with a router or other NAT device associated with the other of the network nodes and vice versa.

Error Auto-Reconnect

The present invention also provides for an error auto-reconnect procedure to cover situations where third-party equipment, other than the authentication server 11 and the network nodes 1, 7, encounters an error which interferes with communication between the authentication server 11 and a network node 1, 7.

This situation is most likely to arise where intermediary equipment, such as a router in a NAT (network address translation) environment, blocks one or more UDP ports which were previously in use, thereby making it necessary for communication to be re-established. This situation is only likely to be discovered when one of the authentication server and a network node decides to communicate with the other.

For the purposes of illustration the subsequent explanation of error auto-reconnect will be based on the first network node 1, but could apply to any network node.

In a situation in which a router in a NAT environment drops or blocks one or more UDP ports at any time t then there are three fundamental states relevant to such an error condition:
 a) Neither the authentication server nor the network node attempts to communicate with the other at any time up to time t by way of UDP;
 b) The network node initiates an attempt to communicate with the authentication server at any time up to time t by way of UDP; and
 c) The authentication server initiates an attempt to communicate with the network node at any time up to time t by way of UDP.

In the case of state a), as neither the authentication server nor the first network node wish to communicate during the relevant time period, then no error is identified or triggered and no action is required.

In the case of state b), the network node closes its private UDP port and then opens the same or a new private UDP port which is within a specified range of applicable ports. A new UDP connection is then made to the router which, in turn, will select another public UDP port within a range made available by an administrator of that router or, if not, any available UDP port.

Steps 1 to 7 of the call set-up procedure are then followed on the assumption that the first network node wishes to make a call to another network node.

In the case of state c), this is the most likely event and arises when the authentication server attempts to communicate with the network node.

This situation will have been triggered by the authentication server 11 having received an error command notification from (say) the first network node 1 relating to another network node, say the second network node 7. The error will be in one of four categories:
 i) The second network node has a "Call-in-Progress" related issue;
 ii) The second network node has gone off-line (when to the first network node it had previously appeared to be on-line);
 iii) The Internet connection to the second network node is down;
 iv) At least one port has been blocked on the router 9 associated with the second network node.

The most common error is iv) because the majority of routers have a time-out feature which closes inactive ports (typically after 10 seconds, but longer if configured by the system administrator). The router effectively removes the mapping between the public UDP port and the internal network so that any data presented to the public UDP port previously in use is rejected by the router. A new mapping can only be created by a device on the internal network initiating a new outgoing session.

Error auto-reconnect involves a number of steps.

Step A

Step A of error auto-reconnect is equivalent to Step 4 of call set-up and involves the first network node 1 communicating with the authentication server 11. The first network node 1 will have completed Step 3 of call set-up by sending dummy packets and either the predetermined period has expired or the predetermined number of dummy packets has been exceeded, or the server will have otherwise determined that an error has occurred.

Step A is based on the following information known to the first network node:
 Telephone number of the user at the second network node (T2)
 Unique ID of the first network node (MAC address) (ID1)
 Unique ID of the second network node (MAC address) (ID2)
 Unique ID of the authentication server (IDs)
 UDP public and private IP address and public and private port of user at the first network node (P1)
 Initial UDP public and private IP address and initial public and private port of user at the second network node (P2)
 Notification that the first network node is attempting to call the second network node (1K2)
 Error command (ERROR)

The first network node 1, having recognised that no successful call has been made, sends a message by UDP to the authentication server 11 as follows:
 *STEPA*; ID1; ID2; IDs; {T2}; {1K2}; {P2};

Step B

In Step B the authentication server 11 signals the second network node 7 by TCP (details of which, it will be recalled, were acquired by the authentication server 11 at LogOn).

Step B is based on the following information known to the authentication server:
 Telephone number of the first network node (T1)
 Telephone number of the second network node (T2)
 Unique ID of the first network node (MAC address) (ID1)
 Unique ID of the second network node (MAC address) (ID2)
 Unique ID of the authentication server (IDs)
 UDP public and private IP address and public and private port of user at the first network node (P1)
 Initial UDP public and private IP address and initial public and private port of user at the second network node (P2)
 Notification that the first network node is attempting to call the second network node (1K2)/Error command (ERROR)

The authentication server 11 immediately signals the second network node 7 by TCP using its known TCP public IP address and public port and unique ID and sends the following message:
 *STEPB*; IDs; ID2; T1; {P1}; {ID1};

Step C

The second network node 7, having received a notification of an error condition will now know that it has to re-establish a UDP connection with the authentication server. Moreover, the second network node will know that an error condition has arisen, probably initiated by the first network node 1.

Step C is based on the following information known to the second network node:

Telephone number of the user at the first network node (T1)

Unique ID of the first network node (MAC address) (ID1)

Unique ID of the second network node (MAC address) (ID2)

Unique ID of the authentication server (IDs)

UDP public and private IP address and public and private port of user at the first network node (P1)

Error command (ERROR)

The second network node 7 immediately checks its status to determine if it is in a Busy state (i.e., an off-hook state and/or an on-hook state but not IDLE) or if it is in a Standby state (i.e., on-hook and IDLE).

If the second network node is in a Busy state, then it ignores the error auto-reconnect command (ERROR) and returns a Busy state to the authentication server 11 by sending the following message:

*STEPC1*; ID2; ID1; {Q2};

where Q2 represents the UDP private IP address and port of the second network node and forms part of P2.

If the second network node is in a Standby state, then it effects a LogOff to close its private UDP port and immediately follows this with a LogOn by initiating an outgoing UDP connection to the authentication server 11 through the specified port (Port 11148), by opening the same or a new private UDP port, thereby causing the router 9 to allocate the same or a new public UDP port. Once the connection is opened and established, the second network node sends the following LogOn Again message by UDP to the authentication server:

*STEPC2*; ID2; IDs; Q2; ID1; T2; {UserName}; {Password}; {T1};

where Q2 represents the UDP private IP address and port of the second network node and forms part of P2. The username, password and telephone number are optional.

Step D

In Step D the authentication server 11 updates the IP address and port information for the second network node 7 in the RAM table and sends by UDP a message to the first network node 1.

Step D is based on the following information known to the authentication server:

Telephone number of the user at the first network node (T1)

Telephone number of the user at the second network node (T2)

Unique ID of the first network node (MAC address) (ID1)

Unique ID of the second network node (MAC address) (ID2)

Unique ID of the authentication server (IDs)

UDP public and private IP address and public and private port of user at the first network node (P1)

Updated UDP public and private IP address and updated public and private port of user at the second network node (P2)

Notification that the first network node is attempting to call the second network node (1K2)/Error command (ERROR)

The message sent by UDP to the first network node is in the following form:

*STEPD*; IDs; ID1; ID2; P2; T2; P1;

Step E

To complete the error auto-reconnect procedure the first network node 1, having originated the error condition, carries out Steps 3 to 7 of the call set-up procedure.

The error auto-reconnect procedure is essentially invisible to the users of the first and second network nodes 1 and 7 and generally takes place without either user becoming aware that a problem has arisen.

The invention claimed is:

1. A method for enabling communication between first and second network nodes (1, 7) by way of a network address translation device (3, 9), which network nodes are each capable of communicating with a server (11), which method comprises the steps of:

causing the first network node (1) to establish communication with the server (11) requesting communication with the second network node (7);

causing the first network node to establish communication with the second network node by way of the network address translation device (3, 9), which step includes sending a plurality of first dummy packets from the first network node directly to the second network node;

causing the server (11) to establish communication with the second network node requesting communication between the second network node and the first network node;

causing the second network node to establish communication with the first network node by way of the network address translation device, which step includes sending a plurality of second dummy packets from the second network node directly to the first network node, transmission of the second dummy packets overlapping with transmission of the first dummy packets;

thereafter exchanging data directly between the first and second network nodes;

the method including the additional steps of:

determining an error if communication between the network nodes (1, 7) is not established within a predetermined time or a predetermined number of dummy packets being transmitted;

in the event that an error is determined, effecting an error auto-reconnect procedure comprising the following further steps:

causing the respective network node (1, 7) to communicate the error to the server (11);

causing the server (11) to communicate the error to the other network node (7, 1) which, in turn, re-establishes communication with the server;

causing the server thereafter to communicate identification details of the other network node (7, 1) to the respective network node (1, 7); and reverting to the step of causing the first network node (1) to establish communication with the second network node (7).

2. A method according to claim 1 wherein the server (11) maintains a record of identification details of all network nodes (1, 7) which may wish to communicate with it.

3. A method according to claim 1, wherein the network address translation device (3, 9) comprises a router.

4. A method according to claim 1 and including the preliminary step of the first and second network nodes (1, 7) logging on to the server (11) to indicate an availability for establishing communication with another network node.

5. A method according to claim 4 wherein the preliminary step and the subsequent steps are effected using different protocols.

6. A method according to claim 1 and including the additional step, prior to the first network node (1) establishing communication with the second network node (7), of causing the server (11) to communicate identification details of the second network node to the first network node.

7. A method according to claim 1 and including the step, prior to the second network node (7) establishing communication with the first network node (1), of causing the server (11) to communicate identification details of the first network node to the second network node.

8. A method according to claim 1 and including, after the step of the first network node (1) establishing communication with the second network node (7), the step of causing the first network node to notify the server (11) that it is establishing communication with the second network node.

9. A method according to claim 1, wherein an error is determined when the first of the predetermined time and the predetermined number of dummy packets is reached.

10. A method according to claim 1, wherein the predetermined time is substantially 4 seconds.

11. A method according to claim 1, wherein the predetermined number of dummy packets is substantially ten packets.

12. A method according to claim 1, wherein communication of the error to the other network node (7, 1) is effected using a different protocol to the other steps of error auto-reconnect.

* * * * *